(12) United States Patent
Yang et al.

(10) Patent No.: US 10,539,409 B2
(45) Date of Patent: Jan. 21, 2020

(54) MEASUREMENT DEVICE FOR TRACTION PIN OF SEMI-TRAILER AND METHOD FOR MEASURING TRACTION PIN USING SAME

(71) Applicant: CHENGDU PROGRESS TECHNOLOGY CO., LTD., Chengdu, Sichuan (CN)

(72) Inventors: Jingyun Yang, Chongqing (CN); Renyu Fang, Sichuan (CN)

(73) Assignee: CHENGDU PROGRESS TECHNOLOGY CO., LTD., Chengdu, Sichuan (CN)

( * ) Notice: Subject to any disclaimer, the term of this patent is extended or adjusted under 35 U.S.C. 154(b) by 0 days.

(21) Appl. No.: 16/322,565

(22) PCT Filed: Apr. 17, 2017

(86) PCT No.: PCT/CN2017/080800
§ 371 (c)(1),
(2) Date: Feb. 1, 2019

(87) PCT Pub. No.: WO2018/072410
PCT Pub. Date: Apr. 26, 2018

(65) Prior Publication Data
US 2019/0204070 A1  Jul. 4, 2019

(30) Foreign Application Priority Data
Oct. 20, 2016  (CN) .................... 2016 2 1140989 U

(51) Int. Cl.
*G01B 11/04* (2006.01)

(52) U.S. Cl.
CPC ................. *G01B 11/043* (2013.01)

(58) Field of Classification Search
CPC ...... G01B 11/14; G01B 11/02; G01B 5/0025; G01M 17/00; G01S 17/08
See application file for complete search history.

(56) References Cited

U.S. PATENT DOCUMENTS

| 6,587,041 | B1 * | 7/2003 | Brown, Jr. ........... B62D 53/125 340/431 |
| 2004/0252019 | A1 * | 12/2004 | Paull ....................... B60D 1/36 340/431 |

(Continued)

FOREIGN PATENT DOCUMENTS

| CN | 202853570 U | 4/2013 |
| CN | 105403162 A | 3/2016 |

(Continued)

*Primary Examiner* — Maurice C Smith
(74) *Attorney, Agent, or Firm* — Novick, Kim & Lee, PLLC; Allen Xue

(57) ABSTRACT

A measurement device for a traction pin of a semi-trailer has a first laser scanner, a second laser scanner and an estimation module. The first laser scanner is installed at the front of a driving direction of a semi-trailer and has a scanning surface parallel to the driving direction of the semi-trailer. The second laser scanner is installed at a side of the driving direction of the semi-trailer and has a scanning surface perpendicular to the driving direction of the semi-trailer. The first laser scanner is at a distance from the ground in accordance with a first predetermined height greater than a maximum allowed height of a semi-trailer to be measured. The second laser scanner is at a distance from the ground in accordance with a second predetermined height less than the maximum allowed height so as to allow the second laser scanner to detect a traction pin of the semi-trailer.

10 Claims, 2 Drawing Sheets

(56) References Cited

U.S. PATENT DOCUMENTS

| | | | | |
|---|---|---|---|---|
| 2006/0261574 A1* | 11/2006 | Milner | ............... | B60D 1/36 |
| | | | | 280/477 |
| 2013/0242314 A1* | 9/2013 | Fowler | ............... | G01S 17/42 |
| | | | | 356/601 |
| 2018/0170459 A1* | 6/2018 | Keatley | ............... | B62D 53/08 |
| 2019/0122053 A1* | 4/2019 | Loeben | ............... | G06T 7/55 |

FOREIGN PATENT DOCUMENTS

| | | |
|---|---|---|
| CN | 205209441 U | 5/2016 |
| CN | 105783750 A | 7/2016 |
| CN | 205403728 U | 7/2016 |
| DE | 102010016205 A1 | 10/2011 |

\* cited by examiner

MEASUREMENT DEVICE FOR TRACTION PIN OF SEMI-TRAILER AND METHOD FOR MEASURING TRACTION PIN USING SAME

TECHNICAL FIELD

The invention relates to the technical field of vehicle detection, and particularly relates to a measurement device for a traction pin of a semi-trailer and a method for measuring the traction pin using the same.

BACKGROUND

With the rapid development of social economy, driving the rapid growth of the automobile industry, automobiles and other motor vehicles become one of the essential means of transportation in the current society. However, in order to gain more economic benefits, some semi-trailer users modify the vehicle size to increase the vehicle volume, so as to increase the one-time transportation volume of a vehicle and reduce the transportation cost, but this move is a serious violation of the safety standard for vehicle use. There are countless traffic accidents due to a vehicle overload every year, among which, semi-trailer accidents cause the most severe economic loss. Therefore, to guarantee the safety of vehicles, the vehicles must be inspected annularly according to the concept of a pin axle base, "a horizontal distance between a central axis of a traction pin of a semi-trailer and a horizontal geometric centerline of a non-turning axle group", in the national standard GB1589-2016 published on Jul. 27, 2016, and pin axle base-related checking and inspection work requirements are raised. To detect the pin axle base, the position of the traction pin is required to be measured at first, but at the present, the traction pin of the semi-trailer is often detected by a manual measurement mode which is extremely low in efficiency, high in labor cost and easily restrained by a measurement tool during inspection of large-sized semi-trailers, and the measurement accuracy and the violation operation are hard to control.

As the measurement of the traction pin is more difficult than that of a length, a width and a height of a vehicle, it is imperative to develop a device for measuring the traction pin of the semi-trailer according to the new requirements of the country for vehicle inspection.

SUMMARY

The invention mainly provides a measurement device for a traction pin of a semi-trailer and a method for measuring the traction pin using the measurement device so as to solve the problem of difficulty in measuring the traction pin.

To solve the above-mentioned technical problem, one technical solution adopted by the invention is to provide a measurement device for a traction pin of a semi-trailer, comprising a first laser scanner, a second laser scanner and an estimation module. The first laser scanner is installed at the front of a driving direction of the semi-trailer, and has a scanning surface parallel to the driving direction of the semi-trailer. The second laser scanner is installed at a side of the driving direction of the semi-trailer, and has a scanning surface perpendicular to the driving direction of the semi-trailer. The first laser scanner is at a distance from the ground in accordance with a first predetermined height, greater than a maximum allowed height of a semi-trailer to be measured. The second laser scanner is at a distance from the ground in accordance with a second predetermined height, less than the maximum allowed height, so as to allow the second laser scanner to detect the traction pin of the semi-trailer. The estimation module is electrically connected with the first laser scanner and the second laser scanner.

The measurement device further comprises a photoelectric sensor installed at a side of the driving direction of the semi-trailer, and the photoelectric sensor is located between the first laser scanner and the second laser scanner, and has a light beam direction perpendicular to the driving direction of the semi-trailer. The photoelectric sensor is at a distance from the ground in accordance with a third predetermined height, less than a height of a tire of the semi-trailer to be measured. The estimation module is also electrically connected with the photoelectric sensor.

The first predetermined height is 4 m-5 m, and the second predetermined height is 0.8 m-1.8 m.

The third predetermined height is less than or equal to 30 cm.

A horizontal distance between the first laser scanner and the second laser scanner is 15 m-22 m, and a horizontal distance between the second laser scanner and the photoelectric sensor is less than or equal to 3 m.

The measurement device for the traction pin of the semi-trailer further comprises a stand and a vertical column. The stand comprises vertical beams and a cross beam. The vertical beams are fixed on the sides of the driving direction of the semi-trailer. The cross beam is horizontally arranged and fixed at the top ends of the vertical beams. The first laser scanner is installed on the cross beam. The vertical column is fixed on the side of the driving direction of the semi-trailer. The second laser scanner is installed on the vertical column.

To solve the above-mentioned technical problems, another technical solution adopted by the invention is to provide a method for measuring a traction pin using any one of the above-mentioned measurement devices for the traction pin of the semi-trailer. The method comprises: acquiring, by an estimation module, a horizontal distance between a first laser scanner and a semi-trailer in real time after the semi-trailer driving according to a driving direction of the semi-trailer enters a measurement range; recording, by the estimation module, a first horizontal distance between the first laser scanner and the semi-trailer when a second laser scanner detects the traction pin of the semi-trailer; recording, by the estimation module, a second horizontal distance between the first laser scanner and the semi-trailer when the second laser scanner detects that the traction pin of the semi-trailer passes by; and estimating, by the estimation module, a horizontal distance between the traction pin of the semi-trailer and the first laser scanner according to the first horizontal distance and the second horizontal distance.

The method further comprises: recording, by the estimation module, a third horizontal distance between the first laser scanner and the semi-trailer after the traction pin of the semi-trailer passes by and when a photoelectric sensor stops receiving a light beam; recording, by the estimation module, a fourth horizontal distance between the first laser scanner and the semi-trailer when the photoelectric sensor receives a light beam again; and estimating, by the estimation module, a pin axle base of the semi-trailer according to the horizontal distance between the traction pin of the semi-trailer and the first laser scanner, the third horizontal distance and the fourth horizontal distance.

The method further comprises: recording, by the estimation module, an initial horizontal distance between the first laser scanner and the semi-trailer when the second laser scanner detects a vehicle head of the semi-trailer; and estimating, by the estimation module, a front turning radius of the semi-trailer according to the initial horizontal distance and the horizontal distance between the traction pin of the semi-trailer and the first laser scanner.

The method further comprises: recording, by the estimation module, a fifth horizontal distance between the first laser scanner and the semi-trailer when the second laser scanner detects a vehicle tail of the semi-trailer; and estimating, by the estimation module, a horizontal distance between a central axis of the traction pin of the semi-trailer and the vehicle tail according to the fifth horizontal distance and the horizontal distance between the traction pin of the semi-trailer and the first laser scanner.

The invention has the beneficial effects that:

1. the traction pin of the vehicle may be measured during driving without vehicles having to stop for inspection, so that the efficiency of measuring the traction pin is effectively improved, the measurement accuracy is relatively high, and the violation operation generated by manual detection is avoided;

2. the device is simple in structure and convenient to install and may not be interfered by environments such as the weather and impounded surface water; and 3. the traction pin, the pin axle base and the front turning radius of the semi-trailer and the horizontal distance between the central axis of the traction pin of the semi-trailer and the vehicle tail may be detected at the same time, which meets a series of detection requirements, specified in the national standard GB1589-2016 published on Jul. 27, 2016, for the semi-trailer, so that the detection efficiency of the vehicle is effectively improved.

DETAILED DESCRIPTION

The technical solutions in the embodiments of the invention will be described below in detail and completely in combination with accompanying drawings in the embodiments of the invention. Obviously, the described embodiments are only part of the embodiments of the invention, not all the embodiments. All of the other embodiments, obtained by those of ordinary skill in the art based on the embodiments of the invention without any inventive efforts, fall into the protection scope of the invention.

Vehicles, required to be subjected to pin axle base detection, related herein are all collectively referred to as semi-trailers.

Figure 1:
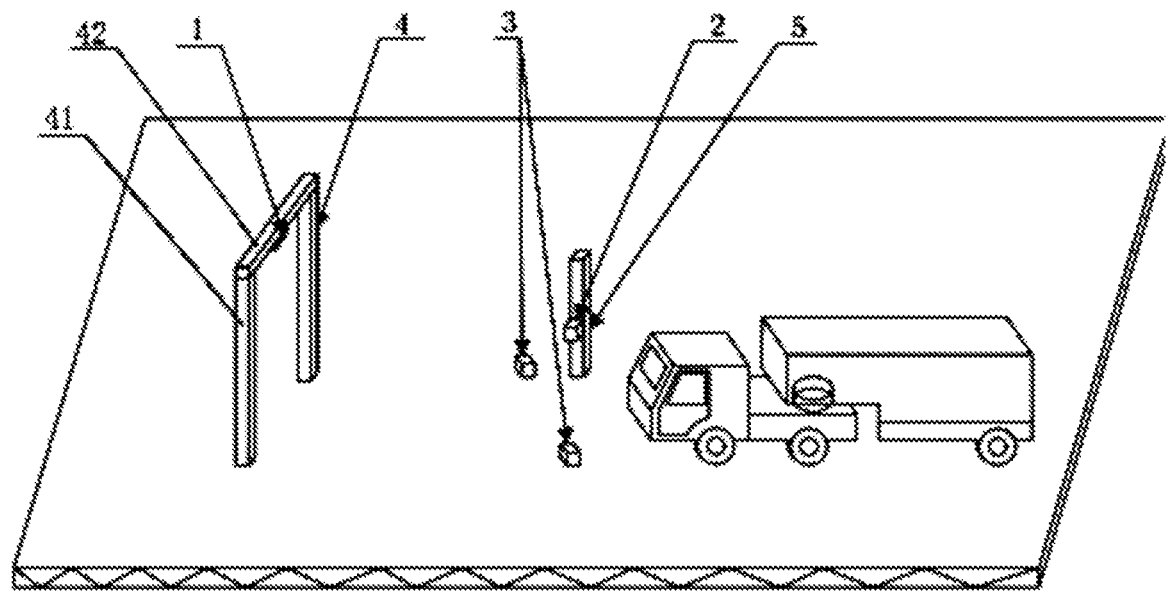
FIG. 1 is a structural schematic diagram of a measurement device for a traction pin of a semi-trailer according to an embodiment of the invention.
Figure 2:
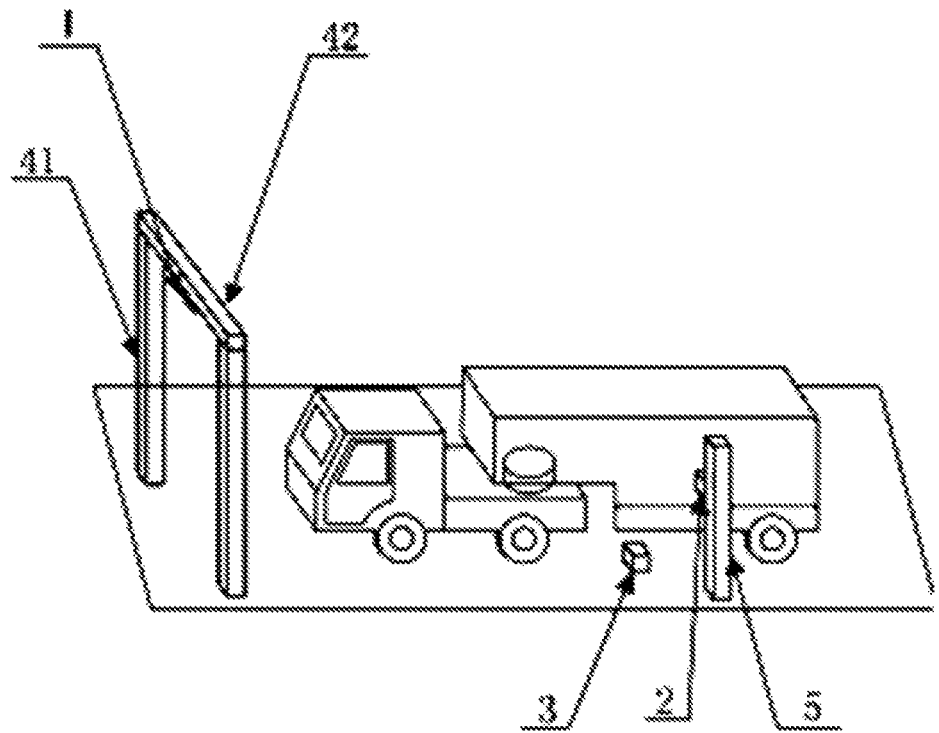
FIG. 2 is a schematic diagram of detecting the semi-trailer by using the measurement device for the traction pin of the semi-trailer according to the embodiment of the invention.

Referring to FIG. 1 and FIG. 2, a measurement device for a traction pin of a semi-trailer according to the embodiment of the invention comprises a first laser scanner 1, a second laser scanner 2 and an estimation module (not shown in the figures).

The first laser scanner 1 is installed at the front of a driving direction of the semi-trailer, and has a scanning surface parallel to the driving direction of the semi-trailer. The first laser scanner is at a distance from the ground in accordance with a first predetermined height, greater than a maximum allowed height of a semi-trailer to be measured, so as to allow the semi-trailer to pass through the space below the first laser scanner 1 successfully. To make a detection effect better and reduce a measurement error, the first laser scanner 1 is located right above the front of the driving direction of the semi-trailer. The driving direction of the semi-trailer is a pre-planned direction. During detection of the semi-trailer, it must drive along its driving direction.

The second laser scanner 2 is installed at a side of the driving direction of the semi-trailer, and has a scanning surface perpendicular to the driving direction of the semi-trailer. The second laser scanner 2 is at a distance from the ground in accordance with a second predetermined height, less than the maximum allowed height, so as to allow the second laser scanner 2 to detect the traction pin of the semi-trailer.

The estimation module is electrically connected with the first laser scanner 1 and the second laser scanner 2.

A position, namely a horizontal distance between the traction pin of the semi-trailer and the first laser scanner, of the traction pin of the semi-trailer relative to the first laser scanner 1 may be measured through cooperation between the first laser scanner 1 and the second laser scanner 2. After the horizontal distance is measured, a pin axle base and a front turning radius of the semi-trailer and a horizontal distance between a central axis of the traction pin of the semi-trailer and a vehicle tail may be further measured on the basis of the horizontal distance.

To measure the pin axle base of the semi-trailer, in this embodiment, the measurement device further comprises a photoelectric sensor 3. The estimation module is also electrically connected with the photoelectric sensor 3. The photoelectric sensor 3 is installed at a side of the driving direction of the semi-trailer and located between the first laser scanner 1 and the second laser scanner 2, and has a light beam direction perpendicular to the driving direction of the semi-trailer. The photoelectric sensor 3 is at a distance from the ground in accordance with a third predetermined height, less than a height of a tire of the semi-trailer to be measured. The lighting direction of the photoelectric sensor 3 being perpendicular to the driving direction of the semi-trailer means that an emitting end and a receiving end of the photoelectric sensor 3 are perpendicular to the driving direction of the semi-trailer.

In this embodiment, the first predetermined height is preferably 4 m-5 m, the second predetermined height is preferably 0.8 m-1.8 m, and the third predetermined height is preferably less than or equal to 30 cm. In this way, the measurement device for the traction pin of the semi-trailer is applicable to current common semi-trailers.

As the traction pins of part of the semi-trailers are low in height and are further provided with uneven parts in the middle, the scanning surface of the second laser scanner 2 is set as being perpendicular to the driving direction of the semi-trailer to further enhance a scanning effect and reduce the influence on the scanning effect caused by the vehicle parts. A light curtain sensor also may be adopted to detect the traction pin of the semi-trailer, but it has a relatively fixed detection height and a small detection range and causes interference extremely easily to severely affect a detection result. Compared with the light curtain sensor adopted to detect the traction pin, the laser scanner adopted to detect the traction pin has the advantages of large collection range, no detection blind area, high environmental adaptability, high interference resistance and the like.

There is a definition below for the front turning radius of the semi-trailer in the national standard GB1589-2016: a distance between the axis of the traction pin of the semi-trailer and a point, farthest to the axis of the traction pin, on the front end of the semi-trailer on a horizontal plane, that is, the front turning radius of the semi-trailer is a distance between the axis of the traction pin and the front end of the semi-trailer, and it is specified in the national standard that the front turning radius of the semi-trailer shall not be more than 2040 mm and a horizontal distance between the central axis of the traction pin of the semi-trailer and the rearmost end of the semi-trailer along the vehicle length shall not be more than 12000 mm (except for a semi-trailer for transporting 45 ft containers), so that an overall length of a combination of a qualified tractor and the semi-trailer does not exceed 15 m. Therefore, in this embodiment, a horizontal distance between the first laser scanner 1 and the second laser scanner 2 is 15 m-22 m, and a horizontal distance between the second laser scanner 2 and the photoelectric sensor 3 is less than or equal to 3 m, so as to guarantee an enough measurement space during measurement of the above-mentioned two pieces of data.

The measurement device for the pin axle base of the semi-trailer provided by the invention has a relatively low requirement on an installation and use environment, and may be very convenient to install. For example, the first laser scanner 1 may be directly fixed on an indoor roof of a building, and the second laser scanner 2 may be directly fixed on a building side wall opposite to the first laser scanner 1. Of course, the first laser scanner 1 and the second laser scanner 2 also may be installed on special mechanisms so as to meet outdoor measurement conditions. For example, in this embodiment, the measurement device for the traction pin of the semi-trailer further comprises a stand 4 and a vertical column 5. The stand 4 comprises vertical beams 41 and a cross beam 42. The vertical beams 41 are fixed on the sides of the driving direction of the semi-trailer. The cross beam 42 is horizontally arranged and fixed at the top ends of the vertical beams 41. The first laser scanner 1 is installed on the cross beam 42. The vertical column 5 is fixed on the side of the driving direction of the semi-trailer. The second laser scanner 2 is installed on the vertical column 5. The stand 4 may be a portal frame or an inverted "L"-shaped frame, so as to allow the semi-trailer to pass conveniently.

Figure 3:
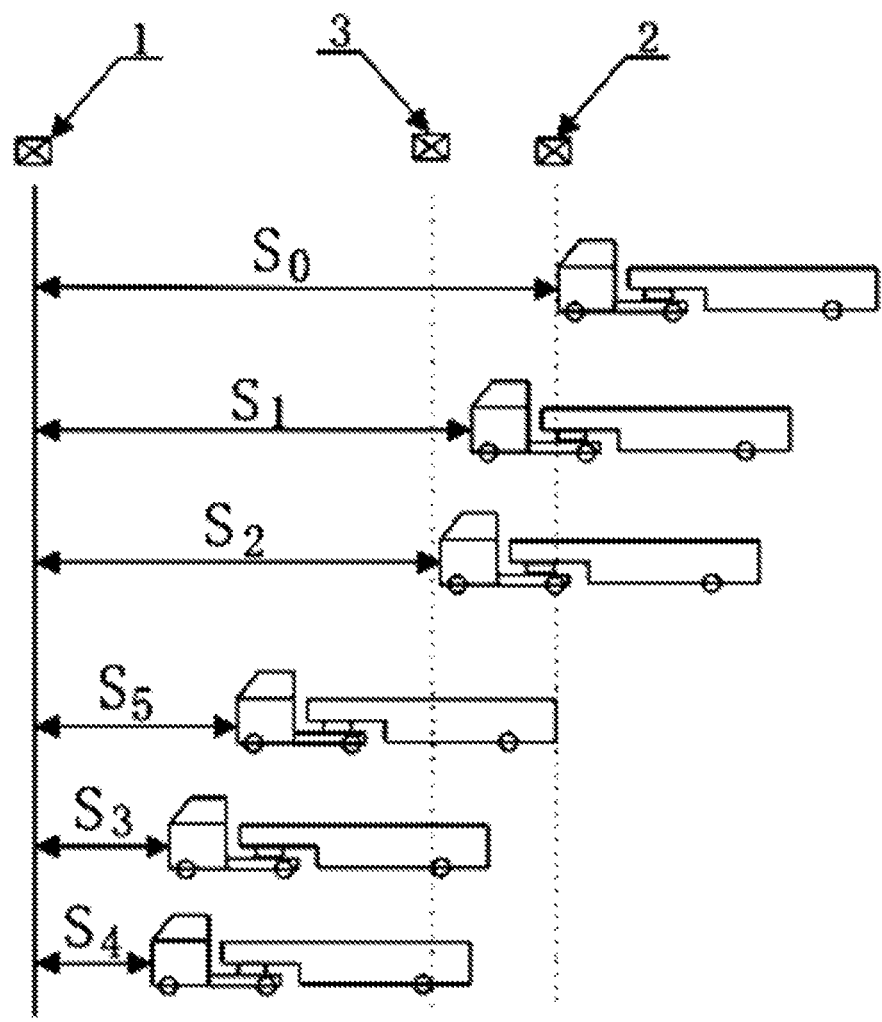
FIG. 3 is a schematic diagram of a measurement principle for measuring the traction pin by adopting the measurement device for the traction pin of the semi-trailer according to the embodiment of the invention.

Referring to FIGS. 1 to 3 in a combined way, the invention further provides a method for measuring a traction pin using any one of the above-mentioned measurement devices for the traction pin of the semi-trailer. The method comprises the steps as follows.

S101: after a semi-trailer driving according to a driving direction of the semi-trailer enters a measurement range, an estimation module acquires a horizontal distance between a first laser scanner 1 and the semi-trailer in real time.

The measurement range may be a scanning range of a second laser scanner 2. If the semi-trailer does not enter the measurement range, the first laser scanner 1 and the photoelectric sensor 3 may be on standby, so as to reduce the power consumption.

S102: when the second laser scanner 2 detects the traction pin of the semi-trailer, the estimation module records a first horizontal distance $S_1$ between the first laser scanner 1 and the semi-trailer.

When the estimation module judges through the second laser scanner 2 that the front end of the traction pin of the semi-trailer enters the scanning surface of the second laser scanner 2, the first laser scanner 1 may measure the first horizontal distance $S_1$ between it and a vehicle head of the semi-trailer at the moment.

S103: when the second laser scanner 2 detects that the traction pin of the semi-trailer passes by, the estimation module records a second horizontal distance $S_2$ between the first laser scanner 1 and the semi-trailer.

When the estimation module judges through the second laser scanner 2 that the rear end of the traction pin of the semi-trailer leaves the scanning surface of the second laser scanner 2, the first laser scanner 1 may measure the second horizontal distance $S_2$ between it and the vehicle head of the semi-trailer at the moment.

S104: the estimation module estimates a horizontal distance between the traction pin of the semi-trailer and the first laser scanner 1 according to the first horizontal distance $S_1$ and the second horizontal distance $S_2$.

$(S_1+S_2)/2$ is a horizontal distance between a central axis of the traction pin of the semi-trailer and the first laser scanner 1, and is the horizontal distance between the traction pin of the semi-trailer and the first laser scanner 1, and a position of the traction pin of the semi-trailer may be determined through the horizontal distance.

To further measure the pin axle base of the semi-trailer, in this embodiment, the method further comprises the steps as follows.

S105: after the traction pin of the semi-trailer passes by, when a photoelectric sensor 3 stops receiving a light beam, the estimation module records a third horizontal distance $S_3$ between the first laser scanner 1 and the semi-trailer.

After the traction pin of the semi-trailer passes through the scanning surface of the second laser scanner 2, a non-turning axle tire, located behind the traction pin, of the semi-trailer may pass through the photoelectric sensor 3 to cover the light beam of the photoelectric sensor 3, so that it is detected that the photoelectric sensor 3 stops receiving the light beam, and at the moment, the estimation module judges through the photoelectric sensor 3 that the front end of the non-turning axle tire of the semi-trailer is just located at the position of the photoelectric sensor 3, and the first laser scanner 1 may measure the third horizontal distance $S_3$ between it and the vehicle head of the semi-trailer.

S106: when the photoelectric sensor 3 receives a light beam again, the estimation module records a fourth horizontal distance $S_4$ between the first laser scanner 1 and the semi-trailer.

When the non-turning axle tire of the semi-trailer leaves the photoelectric sensor 3, the light beam of the photoelectric sensor 3 is no longer covered, so that the photoelectric sensor 3 receives a light beam again. When the estimation module judges through the photoelectric sensor 3 that the rear end of the non-turning axle tire of the semi-trailer leaves the photoelectric sensor 3, the first laser scanner 1 may measure the fourth horizontal distance $S_4$ between it and the vehicle head of the semi-trailer at the moment.

S107: the estimation module estimates the pin axle base of the semi-trailer according to the horizontal distance between the traction pin of the semi-trailer and the first laser scanner 1, the third horizontal distance $S_3$ and the fourth horizontal distance $S_4$.

The horizontal distance between the traction pin of the semi-trailer and the first laser scanner 1 is $(S_1+S_2)/2$, and $(S_3+S_4)/2$ is the horizontal distance between the central axis of a non-turning axle of the semi-trailer and the first laser scanner 1, so $(S_1+S_2)/2-(S_3+S_4)/2$ is the pin axle base of the semi-trailer. It should be noted that the semi-trailer generally has multiple groups of non-turning axle wheels, so there are multiple values for $S_3$ and $S_4$ (one group of values for one group of tires), and two values before and after the light beam of the photoelectric sensor 3 is covered form one group.

To detect the pin axle base and a front turning radius of the semi-trailer at the same time, in the present embodiment, the method further comprises the steps as follows.

S108: when the second laser scanner 2 detects the vehicle head of the semi-trailer, the estimation module records an initial horizontal distance $S_0$ between the first laser scanner 1 and the semi-trailer.

The vehicle head of the semi-trailer may firstly enter the scanning surface of the second laser scanner 2, and when the estimation module judges through the second laser scanner 2 that the vehicle head of the semi-trailer enters the scanning surface of the second laser scanner 2, the first laser scanner 1 may measure the initial horizontal distance $S_0$ between it and the vehicle head of the semi-trailer at the moment.

S108: the estimation module estimates the front turning radius of the semi-trailer according to the initial horizontal distance $S_0$ and the horizontal distance between the traction pin of the semi-trailer and the first laser scanner 1.

The front turning radius of the semi-trailer is $S_0-(S_1+S_2)/2$.

To further detect a horizontal distance between the central axis of the traction pin of the semi-trailer and a vehicle tail, in the present embodiment, the method further comprises the steps as follows.

S109: when the second laser scanner 2 detects the vehicle tail of the semi-trailer, the estimation module estimates a fifth horizontal distance $S_5$ between the first laser scanner 1 and the semi-trailer.

When the estimation module judges through the second laser scanner 2 that the vehicle tail of the semi-trailer leaves the scanning surface of the second laser scanner 2, the first laser scanner 1 may measure the fifth horizontal distance $S_5$ between it and the vehicle head of the semi-trailer at the moment.

S110: the estimation module estimates the horizontal distance between the central axis of the traction pin of the semi-trailer and the vehicle tail according to the fifth horizontal distance $S_5$ and the horizontal distance between the traction pin of the semi-trailer and the first laser scanner 1.

The horizontal distance between the central axis of the traction pin of the semi-trailer and the vehicle tail is $(S_1+S_2)/2-S_5$.

It should be noted that the method of the invention does not limit the driving direction of the semi-trailer, so that the semi-trailer may drive forwards (namely the vehicle head faces the first laser scanner 1), and also may back up (namely the vehicle tail faces the first laser scanner 1). If the semi-trailer drives into the semi-trailer pin axle base measurement device, with its vehicle tail facing the first laser scanner 1, the first laser scanner 1 records the horizontal distance between it and the vehicle tail in real time, the second laser scanner 2 detects the traction pin, and the photoelectric sensor 3 detects rear wheels. The pin axle base, the front turning radius of the semi-trailer and the horizontal distance between the central axis of the traction pin of the semi-trailer and the vehicle tail may be measured only by a length calculation method similar to the method, in which the vehicle head enters the device at first, so that no more details will be described here.

In conclusion, the invention may measure the traction pin, the pin axle base and the front turning radius of the semi-trailer and the horizontal distance between the central axis of the traction pin of the semi-trailer and the vehicle tail during driving of the semi-trailer without vehicles having to stop for inspection, which may effectively improve the measurement efficiency. In addition, the invention is high in measurement accuracy, avoids the violation operation generated by manual detection, and is simple in structure, low in fault rate, resistant to weather interference and high in environmental adaptability.

The above-mentioned descriptions are only the embodiments of the invention, but not intended to limit the patent scope of the invention thereby. Any equivalent structures or equivalent process transformations that are made by using the description of the invention and the contents of the accompanying drawings are directly or indirectly applied to other relevant technical fields and shall similarly fall within the protection scope of the invention.

The invention claimed is:

1. A measurement device for a traction pin of a semi-trailer, comprising: a first laser scanner, a second laser scanner, and an estimation module, wherein the first laser scanner is installed at a front of a driving direction of the semi-trailer and has a scanning surface parallel to the driving direction of the semi-trailer, wherein the second laser scanner is installed at a side of the driving direction of the semi-trailer, and has a scanning surface perpendicular to the driving direction of the semi-trailer, wherein the first laser scanner is disposed at a first predetermined height from a ground surface, and the first predetermined height is greater than a maximum allowed height of the semi-trailer, wherein the second laser scanner is disposed at a second predetermined height from the ground surface, and the second predetermined height is less than the maximum allowed height, so that the second laser scanner is positioned to detect the traction pin of the semi-trailer; and wherein the estimation module is electrically connected with the first laser scanner and the second laser scanner.

2. The measurement device according to claim 1, wherein the measurement device further comprises a photoelectric sensor installed at a side of the driving direction of the semi-trailer, and the photoelectric sensor is located between the first laser scanner and the second laser scanner, and has a light beam direction perpendicular to the driving direction of the semi-trailer, wherein the photoelectric sensor is disposed at a third predetermined height from the ground surface, and the third predetermined height is less than a height of a tire of the semi-trailer, and wherein the estimation module is also electrically connected with the photoelectric sensor.

3. The measurement device according to claim 1, wherein the first predetermined height is 4 m-5 m, and the second predetermined height is 0.8 m-1.8 m.

4. The measurement device according to claim 2, wherein the third predetermined height is less than or equal to 30 cm.

5. The measurement device according to claim 2, wherein a horizontal distance between the first laser scanner and the second laser scanner is 15 m-22 m, and a horizontal distance between the second laser scanner and the photoelectric sensor is less than or equal to 3 m.

6. The measurement device according to claim 1, further comprises a stand and a vertical column; the stand comprises two vertical beams and a cross beam; each of the two vertical beams is disposed on one side of the driving direction of the semi-trailer; the cross beam is horizontally arranged and affixed to the top ends of the two vertical beams; the first laser scanner is installed on the cross beam;

the vertical column is affixed the side of the driving direction of the semi-trailer; and the second laser scanner is installed on the vertical column.

7. A method for measuring a traction pin using the measurement device according to claim 1, comprising:
- acquiring, by the estimation module, a horizontal distance between the first laser scanner and Hall the semi-trailer in real time after the semi-trailer enters a measurement range;
- recording, by the estimation module, a first horizontal distance between the first laser scanner and the semi-trailer when the second laser scanner detects the traction pin of the semi-trailer;
- recording, by the estimation module, a second horizontal distance between the first laser scanner and the semi-trailer when the second laser scanner detects that the traction pin of the semi-trailer; and
- estimating, by the estimation module, a horizontal distance between the traction pin of the semi-trailer and the first laser scanner according to the first horizontal distance and the second horizontal distance.

8. The method according to claim 7, wherein the method further comprises:
- recording, by the estimation module, a third horizontal distance between the first laser scanner and the semi-trailer when a photoelectric sensor stops receiving a light beam;
- recording, by the estimation module, a fourth horizontal distance between the first laser scanner and the semi-trailer when the photoelectric sensor receives a light beam again; and
- estimating, by the estimation module, a pin axle base of the semi-trailer according to the horizontal distance between the traction pin of the semi-trailer and the first laser scanner, the third horizontal distance, and the fourth horizontal distance.

9. The method according to claim 8, wherein the method further comprises:
- recording, by the estimation module, an initial horizontal distance between the first laser scanner and the semi-trailer when the second laser scanner detects a vehicle head of the semi-trailer; and
- estimating, by the estimation module, a front turning radius of the semi-trailer according to the initial horizontal distance and the horizontal distance between the traction pin of the semi-trailer and the first laser scanner.

10. The method according to claim 8, wherein the method further comprises:
- recording, by the estimation module, a fifth horizontal distance between the first laser scanner and the semi-trailer when the second laser scanner detects a vehicle tail of the semi-trailer; and
- estimating, by the estimation module, a horizontal distance between a central axis of the traction pin of the semi-trailer and the vehicle tail according to the fifth horizontal distance and the horizontal distance between the traction pin of the semi-trailer and the first laser scanner.

\* \* \* \* \*